United States Patent
Klos et al.

(10) Patent No.: US 8,579,327 B2
(45) Date of Patent: Nov. 12, 2013

(54) STEERING COLUMN FOR A MOTOR VEHICLE

(75) Inventors: Martin Klos, Ruesselsheim (DE); Torsten Kerz, Bodenheim (DE); Eduard Mendzigall, Waldems (DE)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 13/099,130

(22) Filed: May 2, 2011

(65) Prior Publication Data

US 2011/0278828 A1    Nov. 17, 2011

(30) Foreign Application Priority Data

May 14, 2010  (DE) .......................... 10 2010 020 633

(51) Int. Cl.
*B62D 1/18* (2006.01)
(52) U.S. Cl.
USPC ........................... 280/775; 280/777; 280/779
(58) Field of Classification Search
USPC ......................................... 280/775, 777, 779
See application file for complete search history.

(56) References Cited

U.S. PATENT DOCUMENTS

| | | | |
|---|---|---|---|
| 5,524,927 A | 6/1996 | Toussaint | |
| 5,687,990 A | 11/1997 | Uphaus | |
| 5,743,150 A | 4/1998 | Fevre et al. | |
| 6,039,350 A | 3/2000 | Patzelt et al. | |
| 6,450,532 B1 | 9/2002 | Ryne et al. | |
| 7,322,610 B2 * | 1/2008 | Ishida et al. | 280/779 |
| 7,325,467 B2 * | 2/2008 | Breuss et al. | 74/493 |
| 7,350,815 B2 | 4/2008 | Spano et al. | |
| 7,438,320 B2 * | 10/2008 | Sato et al. | 280/775 |
| 7,475,908 B2 | 1/2009 | Senn | |
| 7,552,945 B2 * | 6/2009 | Sato et al. | 280/775 |
| 7,607,696 B2 | 10/2009 | Graf | |
| 7,914,043 B2 * | 3/2011 | Olgren et al. | 280/775 |
| 8,186,242 B2 * | 5/2012 | Uesaka | 74/493 |
| 8,297,145 B2 * | 10/2012 | Olgren | 74/493 |
| 2004/0159174 A1 | 8/2004 | Raav et al. | |
| 2011/0006510 A1 | 1/2011 | Bastein et al. | |

FOREIGN PATENT DOCUMENTS

| | | |
|---|---|---|
| DE | 102004051060 B3 | 1/2006 |
| DE | 102004034010 A1 | 2/2006 |
| DE | 102008054359 A1 | 5/2010 |
| EP | 0641705 A1 | 3/1995 |
| WO | 2009059655 A1 | 5/2009 |

OTHER PUBLICATIONS

German Patent Office, German Search Report for German Application No. 102010020633.4, dated Jan. 21, 2011.
British Patent Office, British Search Report for Application No. GB1107539.7, dated Aug. 25, 2011.

* cited by examiner

*Primary Examiner* — Toan To
(74) *Attorney, Agent, or Firm* — Ingrassia Fisher & Lorenz, P.C.

(57) ABSTRACT

A steering column is provided for a motor vehicle, which can be moved within a predetermined adjustment range, and in the event of a crash can be shifted beyond the predetermined adjustment range into a crash position, with a steering column cladding and a latching device for locking the steering column into the respective position. The latching device has a manually activatable actuating element, and the steering column cladding and actuating element can be positioned relative to each other in such a way by moving the steering column into the crash position that the actuating element is or can be supported against the steering column cladding as it is being fixed in place with the steering column locked.

15 Claims, 3 Drawing Sheets

STEERING COLUMN FOR A MOTOR VEHICLE

CROSS-REFERENCE TO RELATED APPLICATION

This application claims priority to German Patent Application No. 102010020633.4, filed May 14, 2010, which is incorporated herein by reference in its entirety.

TECHNICAL FIELD

The technical field relates to steering columns for a motor vehicle, which can be moved within a predetermined adjustment range.

BACKGROUND

DE 10 2004 051 060 B3 describes a movable steering column for a motor vehicle, wherein the steering column can be moved within a predetermined adjustment range. A latching device is also provided to lock the steering column in a position within the predetermined regulating range. The latching device has a clamping lever, which can be moved from a closed position, in which the steering column is locked in the respective position by the latching device, to an open position, in which the steering column can be moved in the predetermined adjustment range.

In case of a crash, for example, a frontal collision of the motor vehicle, the steering column can move toward the front, beyond the predetermined regulating range and into a crash position. Moving the steering column toward the front over the predetermined regulating range and into a crash position tangibly reduces the danger of injury to the driver during the crash.

In view of the foregoing, at least one object is to provide a steering column for a motor vehicle that can be moved on the one hand, and offers an especially high level of safety during an accident on the other, where the structural outlay for achieving this advantage is to be especially low. In addition, other objects, desirable features and characteristics will become apparent from the subsequent summary and detailed description, and the appended claims, taken in conjunction with the accompanying drawings and this background.

SUMMARY

One embodiment relates to a steering column for a motor vehicle. The steering column can be moved within a predetermined adjustment range. For example, the steering column can be shifted along its longitudinal axis or pivoted around a swiveling axis within the predetermined adjustment range, so as to move a steering wheel secured at the end of the steering column into the position most comfortable for the driver.

In addition, the steering column is designed in such a way that it can move into a crash position in the event of a crash, for example given a frontal collision. The steering column further has a steering column cladding, which can preferably be moved along with the steering column within the predetermined adjustment range. In addition, a latching device is provided for locking the steering column in the respective position of the latter within the predetermined adjustment range. To this end, the latching device exhibits an actuating element that in particular can be activated manually.

The steering column is also designed in such a way that the steering column cladding and actuating element are positioned relative to each other in such a way by moving the steering column into the crash position that the actuating member is or can be supported against the steering column cladding as it is being fixed in place with the steering column locked. It here is basically unimportant whether the actuating element and/or the steering column cladding actually moves; rather, it is important that the two components move relative to each other in order to position the steering column cladding and actuating element relative to each other in the mentioned way. However, as already described at the outset, it is preferred that the steering column cladding actually moves, while the actuating element is essentially fixed in place.

As a consequence, it is especially preferred that the movement of the steering column cladding be coupled with the movement of the steering column, at least as the steering column moves into the crash position. The actuating element could basically be supported directly or indirectly against the steering column cladding. However, it is preferable for the actuating element to be indirectly supported against the steering column cladding by means of a supporting element secured to the actuating element, as will be described later with reference to an advantageous embodiment that describes a support brace for supporting the actuating element against the steering column cladding, especially since this makes it possible to tangibly reduce the structural outlay.

Moving the steering column into the crash position to position the steering column cladding and actuating element relative to each other in such a way that the actuating element is or can be supported against the steering column cladding as it is fixed in place with the steering column locked prevents the actuating element from undesirably being moved into a position during the accident and even thereafter in which the steering column is not locked by the latching device. In this way, the steering column is prevented from moving uncontrollably during an accident, thereby tangibly reducing the danger of injury to the driver or other vehicle passengers. In addition, the use of the steering column cladding as the component supporting the actuating element ensures an especially simple structural design, especially since one component that is present anyway, specifically the steering column cladding, is used to support the actuating element. As a consequence, an additional component or additional modular unit is not required for supporting the actuating element.

In an advantageous embodiment of the steering column, the actuating element can be moved from a closed position, in which the steering column is locked in the respective position by the latching device, into an open position, in which the steering column has been released by the latching device, and can hence be moved within the predetermined adjustment range. In addition, the actuating element is or can be supported against the steering column cladding, and hence fixed in place, by moving the steering column into the crash position while it is locked.

In another advantageous embodiment of the steering column, the steering column cladding and actuating element are positioned relative to each other in a predetermined adjustment range of the steering column in such a way that the actuating element can be moved from the closed position into the open position and vice versa. In other words, the steering column cladding poses no obstacle for the actuating element, as long as the steering column is or has been moved within the predetermined adjustment range, thereby ensuring a reliable operation of the actuating element, and hence the latching device, during the normal operation of the motor vehicle, and independently of the respective position of the steering column within the predetermined adjustment range.

In order to enable a particularly flexible positioning of the steering column in relation to the respective driver, the steering column in an especially advantageous embodiment of the steering column according to the invention can be pivoted into various pivot positions around a swiveling axis preferably running in a transverse direction and/or is designed so that it can slide along the longitudinal axis of the steering column into different longitudinal positions.

In another embodiment of the steering column, the latter is configured in such a way that the steering column cladding and actuating element can be positioned relative to each other independently of the preceding position of the steering column within the predetermined adjustment range in the event of a crash in such a way that the actuating element is or can be supported against the steering column cladding with the steering column in the crash position, so as to fix the actuating element in place. The advantage to this is that the driver can select any position of the steering column within the predetermined adjustment range, without in the process running the danger that the actuating element is or cannot be supported against the steering column cladding in the event of a crash or with the steering column in the crash position. For example, the embodiment described below can be used to enable a corresponding relative positioning of the steering column cladding in relation to the actuating element independently of the preceding position of the steering column within the predetermined adjustment range in the event of a crash.

For example, the steering column in another preferred embodiment of the invention is coupled with the steering column cladding, actuating element and latching device in such a way that the steering column together with the steering column cladding, actuating element and latching device can be pivoted around the swiveling axis within the adjustment range. As already indicated above, this always enables a reliable positioning of the steering column cladding relative to the actuating element, independently of the selected position of the steering column within the predetermined adjustment range, while swiveling the actuating element along with the steering column produces no change in state, especially since the latching device is also swiveled together with the steering column.

In another embodiment of the steering column, the actuating element is designed as an actuating lever that can be swiveled relative to the latching device. Because an actuating lever is used, the driver only has to exert a slight actuating force on the actuating lever in order to exert a lever-enhanced adjusting force or lever-enhanced controlling torque on the latching device, thereby enabling a more comfortable operation of the latching device. In addition, using an actuating lever makes it possible to guide the actuating end of the actuating lever relatively tightly into the area of the driver, without significantly increasing the structural outlay. In this embodiment, it is preferred that the actuating lever interact directly with the latching device or the input hub of the latching device, and that it be possible for the driver to directly actuate it manually. In addition, it is especially preferred in this embodiment that the actuating lever can be pivoted around a swiveling axis running in the transverse direction relative to the latching device, especially since this also enables a more comfortable operation of the actuating lever and the ensuing latching device, wherein the swiveling axis of the actuating lever can coincide with the swiveling axis of the steering column, for example, so as to achieve a relatively compact structure.

In another embodiment of the steering column, the actuating lever is essentially L-shaped and composed of a first and second leg. Because the actuating lever is L-shaped, the actuating lever can be guided passed other components, such as the steering column cladding, in an especially easy and space-saving manner without having to substantially modify their structural design. In this embodiment, it is preferred that the first leg extends downward in the vertical direction, proceeding from the latching device, while the ensuing second leg extends in the direction of the driver or in the direction of the steering wheel of the steering column, thereby yielding the advantage additionally to the one mentioned above that the second leg is arranged relatively close by the driver, allowing him/her to easily reach or grip the latter.

In order to arrange the actuating lever in an especially space-saving manner and largely prevent an unintended activation of the latter, the side of the steering column cladding facing the actuating lever and aligned in the transverse direction has a depression that at least partially accommodates the actuating lever in another embodiment of the steering column. If the L-shaped actuating lever already described above comes to be used in this embodiment, it is preferred that the second leg of the actuating lever be accommodated at least partially in the depression, so as to arrange the relatively long second leg in a space-saving manner and protect it against an unintended activation.

As already alluded to above, another embodiment of the steering column lies in the fact that the actuating element can be or is indirectly supported against the steering column cladding via a supporting element secured to the actuating element, wherein such a supporting element is preferably not arranged in the force or torque transfer path toward the latching device during activation of the actuating element. Based on this fundamental and preferred embodiment, the actuating lever, preferably the first leg of the actuating lever, in another embodiment of the steering column has arranged on it a projecting support brace, with which the actuating lever can be or is supported indirectly against the steering column cladding with the steering column in the crash position. By using an additional supporting element or additional support brace on the actuating lever that additionally is preferably not arranged in the force transfer path, the structural designer has a greater creative freedom in configuring the actuating lever and steering column cladding, especially since the mentioned components need only be adjusted to a slight extent to ensure the aforementioned support function in the event of a crash.

In order to enable a relatively simple structure of the steering column cladding despite the added supporting function as described above, the support brace in another especially advantageous embodiment of the steering column according to the invention extends from the actuating lever, preferably from the first leg of the latter, toward an opening in the steering column cladding, wherein the support brace is introduced through the opening into the steering column cladding with the steering column in the crash position. Since the steering column cladding has an opening facing the front as a rule anyway, only a slight, if any, adjustment of the steering column cladding to the new support function is required. In addition, the support brace in this embodiment is reliably covered by the steering column cladding when a crash occurs, thereby eliminating any and all danger of injury to the vehicle passengers by the support brace.

In another embodiment of the steering column, an end section of the support brace facing away from the actuating lever is designed as an end section upwardly curved or bent in the vertical direction, against which one edge of the opening in the steering column cladding can be supported and guided. The advantage to this is that it offsets any pivoting clearance the actuating lever might have in the closed position if the steering column moves into the crash position. In other words, the steering column cladding and actuating lever are reliably positioned relative to each other in the event of a crash even if the setting or closed position of the actuating lever is not its final position.

Based on the embodiment described above, the end section of the actuating lever in another especially advantageous embodiment of the steering column according to the invention is curved or bent in such a way that the end section can also be supported and guided against the edge of the opening in the steering column cladding when the steering column moves into the crash position, while the actuating lever is in the open position, so that the actuating lever is automatically switched into the closed position by the motion of the steering column into the crash position. The advantage to this is that the actuating lever is switched to the closed position in the event of a crash even if the driver has not yet returned the actuating lever to the closed position after the adjustment of the steering column and before the accident.

In another embodiment of the steering column, the support brace is or can be supported downwardly against the steering column cladding in a vertical direction with the steering column in the crash position. According to another embodiment of the steering column, the support brace is or can be supported against a wall section of the steering column cladding that upwardly borders the depression for the actuating lever in a vertical direction with the steering column in the crash position, as a result of which the steering column cladding has a compact, simple and space-saving structure.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
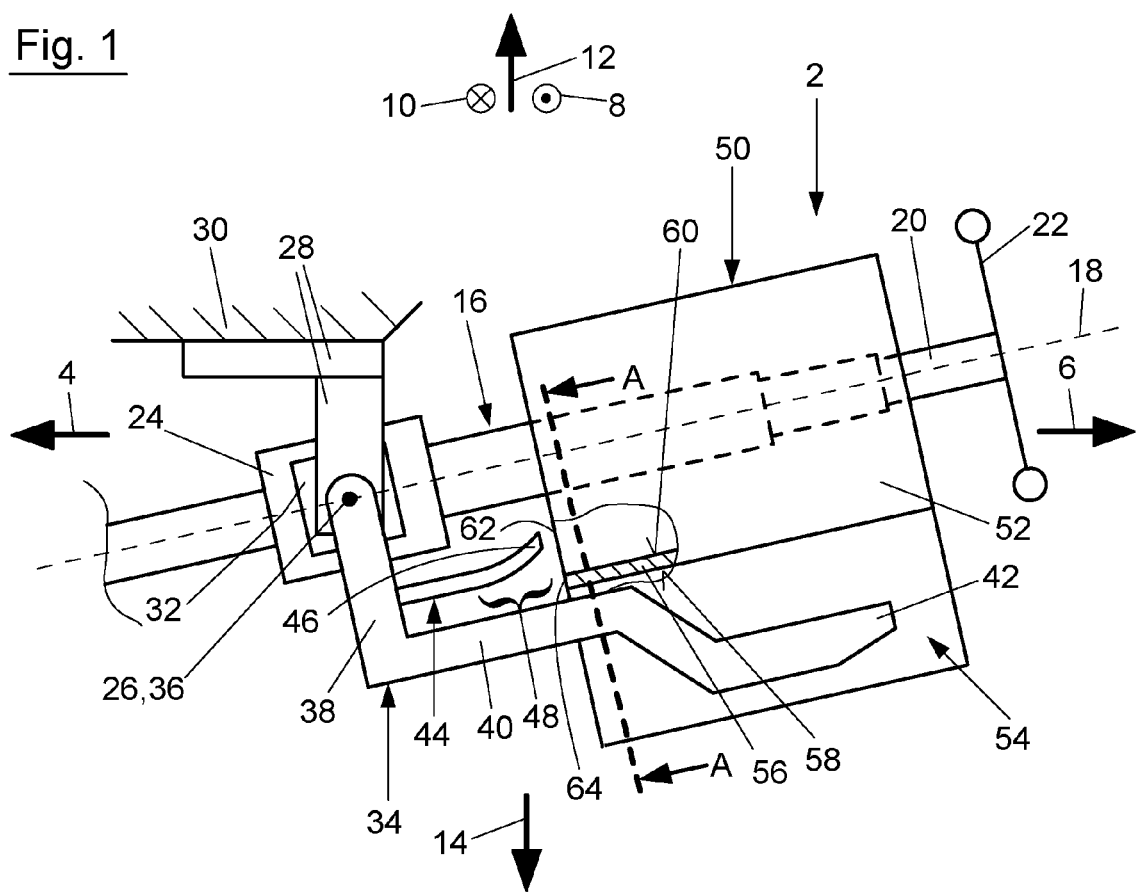
FIG. 1 is a diagrammatic side view of an embodiment of the steering column according to the invention with the actuating lever in the closed position.

FIG. 1 shows a diagrammatic side view of a steering column arrangement 2 inside a motor vehicle, wherein the mutually opposed longitudinal directions 4, 6, the mutually opposed transverse directions 8, 10, and the mutually opposed vertical directions 12, 14 of the motor vehicle are denoted by corresponding arrows. The longitudinal direction 4 here corresponds to the forward direction of the motor vehicle. The steering column arrangement 2 has a steering column 16, which extends along a longitudinal axis 18, wherein the longitudinal axis 18 is inclined relative to the longitudinal directions 4, 6 and the vertical directions 12, 14.

The steering column 16 here essentially has a steering gear shaft 20, whose end pointing in the longitudinal direction 6 is joined with a steering wheel 22. The steering gear shaft 20 is telescoping in the present example, and extends in the opposite longitudinal direction 4 through an adjustment section 24, and beyond that up to a steering gear (not shown). As a result, a rotating motion of the steering wheel 22 can be imparted via the steering gear shaft 20 to the steering gear (not shown). The adjustment section 24 is secured to a retaining section 28 so that it can pivot around a swiveling axis 26 running in the transverse direction 8, 10, wherein the retaining section is integrated in the motor vehicle structure 28. This allows the steering column 16 to pivot around the swiveling axis 26 into various pivot positions within a predetermined adjustment range. In addition, the adjustment section 24 is designed in such a way that the steering column 16 can be shifted along the longitudinal axis 18 of the steering column 16 into various longitudinal positions within the predetermined adjustment range. Let reference here be made to prior art with regard to the structural design of the adjustment section 24, for example which can also encompass a so-called steering column jacket.

Figure 3:
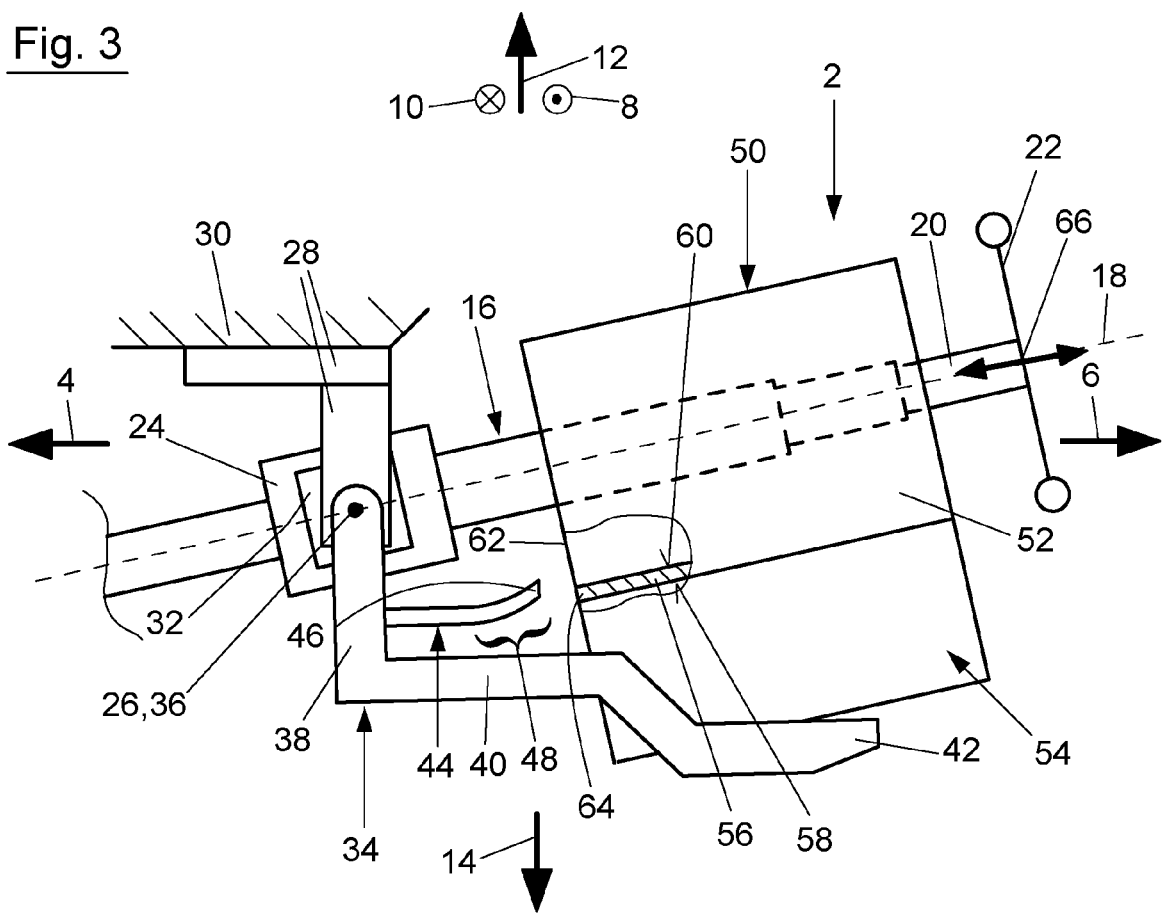
FIG. 3 is the steering column on FIG. 1 with the actuating lever in the open position.
Figure 4:
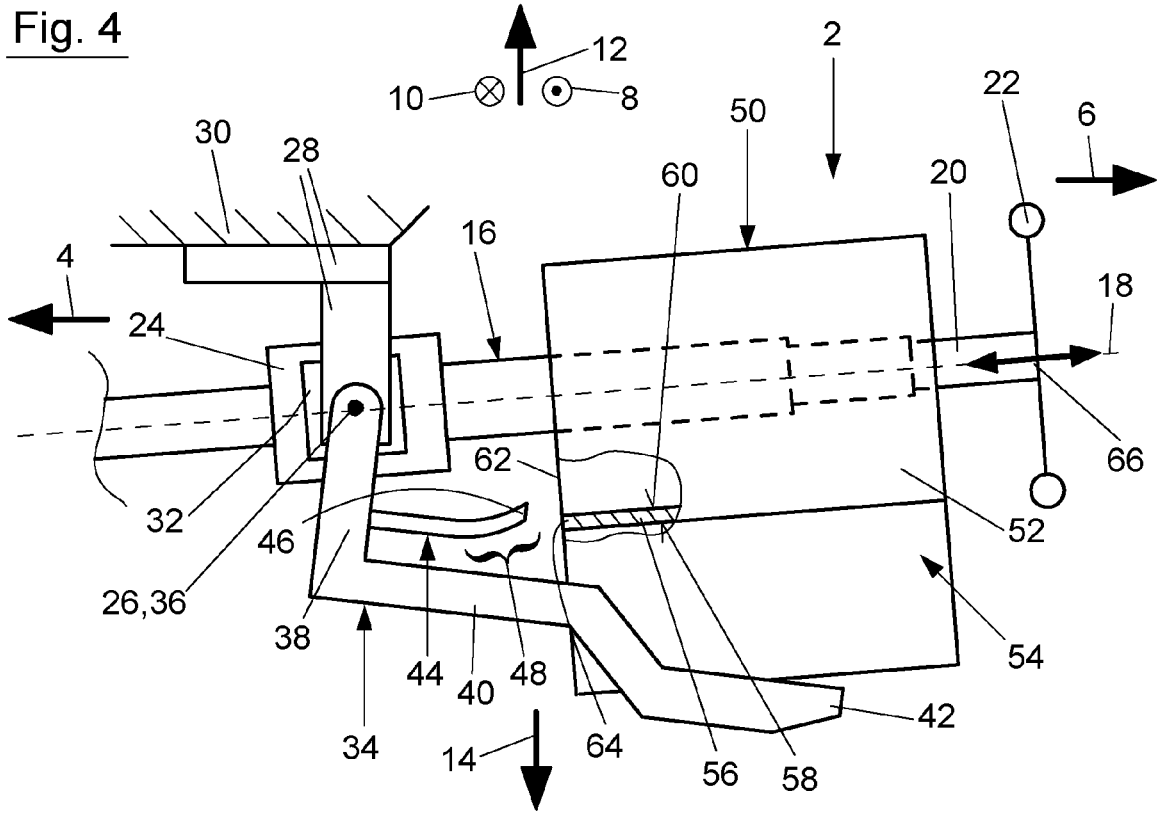
FIG. 4 is the steering column on FIG. 3 after it has been moved within the predetermined adjustment range.

The adjustment section 24 or steering column 16 further has allocated to it a latching device 32 for locking the adjustment section 24 or steering column 16 in the respective pivot or longitudinal position within the predetermined adjustment range. The latching device 32 also has a manually activatable actuating element in the form of an actuating lever 34. The actuating lever 34 can be pivoted around a swiveling axis 36 extending in the transverse direction 8, 10 relative to the latching device 32, wherein the swiveling axis 26 corresponds with the swiveling axis 26 of the steering column 16 in the present example. The actuating lever 34 is here essentially L-shaped, and consists of a first leg 38 and a second leg 40. The first leg 38 proceeds from the swiveling axis 36 or latching device 32 downward in a vertical direction 14, while the ensuing second leg 40 essentially extends toward the back in the longitudinal direction 6, and hence toward the driver (not shown) or steering wheel 22. The actuating end 42 of the actuating lever 34 facing the driver can be easily reached and operated by the driver, so that the driver can exert an actuating force or actuating torque directly on the actuating lever 34. In this way, the actuating lever 34 can be transferred or pivoted from the closed position shown on FIG. 1, in which the steering column 16 is locked in the respective pivot and longitudinal position, downward in a vertical direction 14 around the swiveling axis 36 and into an open position depicted on FIGS. 3 and 4, into which the steering column 16 can be moved by pivoting around the swiveling axis 26 and/or longitudinally shifting along the longitudinal axis 18 in the predetermined adjustment range.

Also arranged on the first leg 38 of the actuating lever 34 is a projecting supporting element in the form of a projecting support brace 44, which proceeds from the first leg 38 toward the back in the longitudinal direction 6, extending essentially parallel to the second leg 40 up to its free end 46. The support brace 44 here exhibits an end section 48 that is allocated to the free end 46, faces away from the first leg 38 of the actuating lever 34, and is upwardly curved or bent in the vertical direction 12. How the support brace 44 works will be explained in more detail later.

Figure 2:
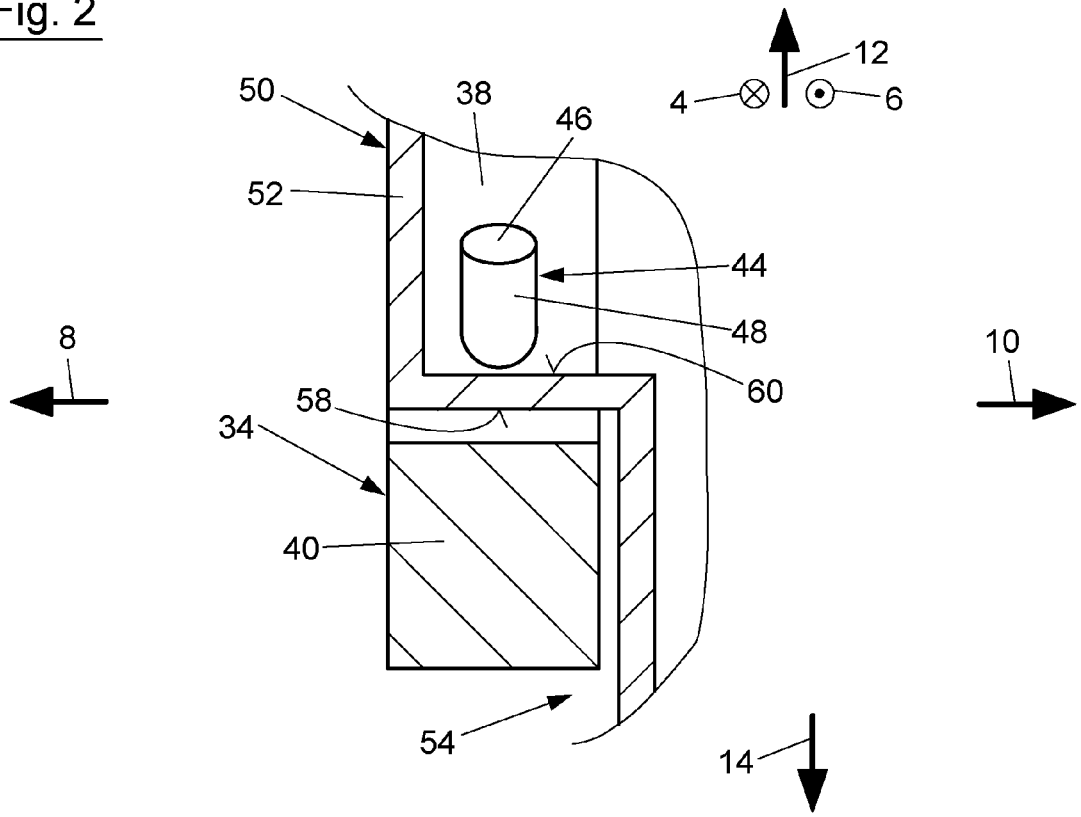
FIG. 2 is a partial cross sectional view along the section line A-A on FIG. 1.

The steering column 16 also has allocated to it a steering column cladding 50, which at least partially envelops the steering column 16, and is arranged along the longitudinal axis 18 between the steering wheel 22 on the one hand and the adjustment section 24 on the other. The steering column cladding 50 is coupled with the steering column 16 in such a way that it along with the steering column 16 can pivot around the swiveling axis 26, and shift along the longitudinal axis 18 of the steering column 16. The steering column cladding 50 has a wall 52 arranged in the transverse direction 8 next to the steering column 16. This wall 52 or the side of the steering column cladding 50 formed by the wall 52 here faces the actuating lever 34 or its second leg 40, which is arranged in a transverse direction 8 laterally next to the wall 52. As may be seen from FIG. 2, the side of the steering column cladding 50 formed by the wall 52 is provided with a depression 54, in which the second leg 40 of the actuating lever 34 is at least partially accommodated, as evident in particular on FIGS. 1 and 2. The depression 54 is here upwardly bounded in the vertical direction 12 by a wall section 56 of the wall 52, wherein the wall section 56 has a lower side 58 facing the second leg 40 in the vertical direction 14, and an upper side 60 pointing upward in the vertical direction 12 facing away from the depression 54.

The steering column cladding 50 also has an opening 62 pointing forwardly in the longitudinal direction 4. In this case, the opening 62 is bordered by a lower edge 64, which is here formed by the edge of the wall section 56 pointing forwardly in the longitudinal direction 4. As may be seen from FIG. 1 and FIG. 2, the aforementioned support brace 44 proceeds from the first leg 38 of the actuating lever 34 and extends toward the opening 62 in the steering column cladding 50, wherein the support brace 44 is not introduced into the opening 62 in the positions of the steering column 16 shown on FIG. 1 to FIG. 4 within the predetermined adjustment range. Additional features of the steering column arrangement 2 and how it operates will be explained in greater detail below with reference to FIG. 1 to FIG. 5.

The actuating lever 34 on FIG. 1 is in the closed position relative to the latching device 32, so that the latching device 32 causes the steering column 16 to be locked in the depicted pivot and longitudinal position. In order to be able to alter the pivot position of the steering column 16 around the swiveling axis 26 and/or the longitudinal position of the steering column 16 along the longitudinal axis 18, the driver must grip an actuating lever 34 at its actuating end 42 so as to then pivot the actuating lever 34 relative to the latching device 32 around the swiveling axis 36 and into the open position shown on FIG. 3. As a result, the adjustment section 24 is released by the latching device 32 in such a way that the steering column 16 can be pivoted around the swiveling axis 26 within the predetermined adjustment range and into another pivot position, as shown by example on FIG. 4. While pivoting the steering column 16, the steering column cladding 50, actuating lever 34 and latching device 32 are pivoted in conjunction with the steering column 16, so that the actuating lever 34 remains in its open position relative to the latching device 32. In addition, the steering column 16 can be shifted along the longitudinal axis 18 into various longitudinal positions within the predetermined adjustment range, as denoted by the double arrow 66 on FIGS. 3 and 4. In none of the pivot or longitudinal positions selectable within the predetermined adjustment range is the support brace 44 positioned relative to the steering column cladding 50 in such a way as to impede the actuating lever 34 from pivoting between the closed position and open position. In addition, the force or torque transfer path runs from the actuating end 42 via the actuating lever 34 until the latching device 32, but not via the support brace 44, which is here only in included in the motion or pivoting. Once the steering column 16 has reached the desired pivot and longitudinal position, the actuating lever 34 need only be pivoted back into the closed position shown on FIG. 1 from the open position shown on FIGS. 3 and 4 around the swiveling axis 36 relative to the latching device 32 to lock the steering column 16 in the selected pivot and longitudinal position. In this way, the steering wheel is positioned and secured in the desired way relative to the driver (not shown).

Figure 5:
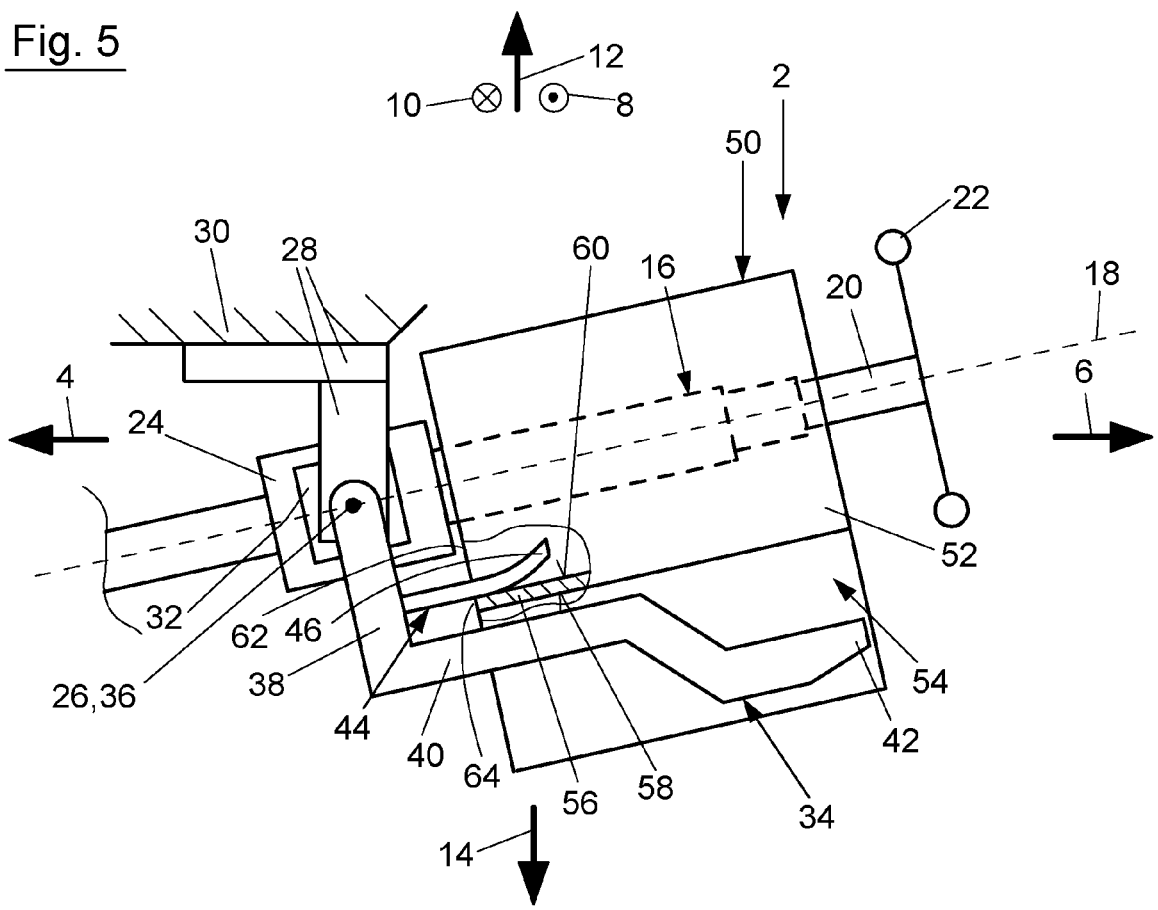
FIG. 5 is the steering column on FIG. 1 in the crash position.

In the crash depicted on FIG. 5, which can involve a frontal collision of the motor vehicle, for example, the steering column 16 can be moved toward the front in the longitudinal direction 4 or toward the front along the longitudinal axis 18, beyond the predetermined adjustment range described above into a crash position. As the steering column 16 moves out of the adjustment range into the crash position shown on FIG. 5 in this way, energy absorbers (not depicted) can also act on the steering column 16 to dampen the movement of the steering column 16 into the crash position. Since the steering column cladding 50 described above or its movement is coupled with the motion of the steering column 16, the steering column cladding 50 also continues to move toward the front in the longitudinal direction 4 along the longitudinal axis 18 if the steering column 16 is moved into the crash position. As a result, the free end 46 of the actuating lever 34 passes through the opening 62 and into the steering column cladding 50, during which the end section 48 of the support brace 44 upwardly curved or bent in the vertical direction 12 offsets any pivoting clearance that may be present with respect to the actuating lever 34 around the swiveling axis 36 in its closed position by virtue of the fact that the curved or bent end section 48 is supported against the edge 64 of the opening 62 at least occasionally, and forces the edge 64 of the opening 62 downward in the vertical direction 14, under the support brace 44, as the steering column cladding 50 is shifted further in the longitudinal direction 4 along the longitudinal axis 18. Let it be further noted that the end section 48 of the support brace 44 is curved or bent in such a way that the end section 48 can be supported and guided against the edge 64 of the opening 62 even when the steering column 16 is moving in the crash position according to FIG. 5 and the actuating lever 34 is located in the open position according to FIG. 3 and FIG. 4. As a result, the actuating lever 34 is automatically pivoted around the swiveling axis 36 and into the closed position by moving the steering column 16 and steering column cladding 50 into the crash position.

In the crash position, the support brace 44 is downwardly supported in the vertical direction 14 against the upper side 60 of the wall section 56 of the wall 52 described above, so that the actuating lever can no longer be downwardly pivoted around the swiveling axis 36 in a vertical direction into the open position described above. As a consequence, the steering column cladding 50 is positioned relative to the actuating lever 34 in such a way with the steering column 16 in the crash position as to fix the actuating lever 34 in its closed position during the crash and after the crash. This prevents the actuating lever 34 from inadvertently pivoting from the closed position into the open position during the crash, which can lead to an uncontrolled motion on the part of the steering column 16. This tangibly reduces the risk of injury to the driver.

As further evident from the above description, the steering column cladding 50 is positioned in such a way relative to the actuating lever 34 in the event of a crash that the actuating lever 34 can be or is supported against the steering column cladding 50 with the steering column 16 in the crash position, independently of the pivot or longitudinal position of the steering column 16 preceding the crash within the predetermined adjustment range. This provides the driver with an elevated level of security in the event of an accident in any selected pivot or longitudinal position of the steering column 16.

Since only one or several exemplary embodiments were described above, let it be noted that a plurality of variations and deviations are essentially possible. Let it further be noted that the described embodiments are only examples, which do not limit the scope of protection, applicability or structural design. Rather, the abstract and described embodiments only constitute a practical instruction for the expert, based upon which the expert can arrive at least at one exemplary embodiment. It here goes without saying for the expert that various modifications relating to the function and arrangement of elements described with reference to the exemplary embodiments can be introduced without deviating from the sphere of the attached claims and their equivalents.

What is claimed is:

1. A steering column for a motor vehicle that is configured to move within a predetermined adjustment range and shift into a crash position beyond the predetermined adjustment range in event of a crash, comprising:
   a steering column cladding;
   a latching device configured to lock in a respective position and comprising an actuating element,
   wherein the steering column cladding and the actuating element are positioned relative to each other by moving the steering column into the crash position such that the actuating element is supported against the steering column cladding when fixed in place with a locking of the steering column,
   wherein the actuating element is configured to switched from a closed position, in which the steering column is locked in the respective position, into an open position, in which the steering column is moved in the predetermined adjustment range.

2. The steering column according to claim 1, wherein the steering column cladding and the actuating element are positioned in such a way relative to each other in the predetermined adjustment range of the steering column that the actuating element is switched from the closed position to the open position.

3. The steering column according to claim 1, wherein the steering column is configured to pivot around a swiveling axis running in a transverse direction into various pivot positions within the predetermined adjustment range.

4. The steering column according to claim 3, wherein the steering column along with the steering column cladding, the actuating element, and the latching device are configured to pivot around the swiveling axis within the predetermined adjustment range.

5. The steering column according to claim 1, wherein the steering column is configured to pivot around a swiveling axis shifted along a longitudinal axis of the steering column into various longitudinal positions.

6. A steering column for a motor vehicle that is configured to move within a predetermined adjustment range and shift into a crash position beyond the predetermined adjustment range in event of a crash, comprising:
   a steering column cladding;
   a latching device configured to lock in a respective position and comprising an actuating element,
   wherein the steering column cladding and the actuating element are positioned relative to each other by moving the steering column into the crash position such that the actuating element is supported against the steering column cladding when fixed in place with a locking of the steering column,
   wherein the steering column cladding and the actuating element are positioned relative to each other in the event of the crash such that the actuating element is supported against the steering column cladding with the steering column in the crash position, independently of a preceding position of the steering column within the predetermined adjustment range.

7. A steering column for a motor vehicle that is configured to move within a predetermined adjustment range and shift into a crash position beyond the predetermined adjustment range in event of a crash, comprising:
   a steering column cladding;
   a latching device configured to lock in a respective position and comprising an actuating element,
   wherein the steering column cladding and the actuating element are positioned relative to each other by moving the steering column into the crash position such that the actuating element is supported against the steering column cladding when fixed in place with a locking of the steering column,
   wherein the actuating element is an actuating lever configured to pivot relative to the latching device,
   wherein the actuating lever is configured to pivot around a swiveling axis running in a transverse direction.

8. The steering column according to claim 7,
   wherein the actuating lever is essentially L-shaped and composed of a first leg and a second leg,
   wherein the first leg extends downward in a vertical direction, proceeding from the latching device, while the second leg extends in a driver direction.

9. The steering column according to claim 7, wherein the side of the steering column cladding facing the actuating lever and aligned in the transverse direction has a depression that at least partially accommodates the actuating lever.

10. The steering column according to claim 9, further comprising a projecting support brace arranged on the actuating lever with which the actuating lever is indirectly supported against the steering column cladding with the steering column in the crash position.

11. The steering column according to claim 10, wherein the projecting support brace extends from the actuating lever toward an opening in the steering column cladding, and the projecting support brace is introduced through the opening into the steering column cladding with the steering column in the crash position.

12. The steering column according to claim 11, wherein an end section of the projecting support brace facing away from the actuating lever upwardly curves in a vertical direction against which one edge of the opening is supported and guided.

13. The steering column according to claim 12, wherein the end section is curved such that the end section is be supported and guided against an edge of the opening even if the steering column moves into the crash position while the actuating lever is in an open position, so that the actuating lever is automatically switched into a closed position by a motion of the steering column into the crash position.

14. The steering column according to claim 10, wherein the projecting support brace is supported downwardly against the steering column cladding in a vertical direction with the steering column in the crash position.

15. The steering column according to claim 14, wherein the projecting support brace is supported against a wall section of the steering column cladding that upwardly borders the depression for the actuating lever in the vertical direction with the steering column in the crash position.

* * * * *